United States Patent Office 3,705,822
Patented Dec. 12, 1972

3,705,822
PROCESS FOR CREASE RESISTANT TEXTILES
John Peter Dundon, Branchburg Township, Somerset County, N.J., assignor to American Cyanamid Company, Stamford, Conn.
No Drawing. Original application July 7, 1964, Ser. No. 380,915, now Patent No. 3,465,036, dated Sept. 2, 1969. Divided and this application Mar. 5, 1968, Ser. No. 723,971
Int. Cl. D06m 13/00
U.S. Cl. 117—139.4   4 Claims

ABSTRACT OF THE DISCLOSURE

Crease resistance is imparted to cellulosic textile materials by applying an aqueous solution of a methylolated amide derivative of the formula $(XOOC)_mD[CH_2(Y)CO \cdot NH \cdot CH_2OH]_n$ wherein Y is —CH$_2$— or —OCH$_2$CH$_2$—; D is —C—; —CH$_2$—O—CH$_2$—C or —CH$_2$·N—, n is 2 or 3 and m is 4—n, and X is hydrogen, alkyl or a monovalent salt-forming atom or group and then drying and curing by the application of heat.

---

This application is a division of application Ser. No. 380,915, filed July 7, 1964; now U.S. Pat. No. 3,465,036 (1969).

This invention relates to a process for imparting crease resistance to cellulosic textile material by applying an aqueous solution of a poly(methylolamide) compound containing at least one carboxy group, to the cellulosic material, drying the treated material and curing the compound in the presence of a catalyst and by the application of heat.

Many textile finishes have been described heretofore as being "wrinkle-resistant," "minimum care," "drip-dry," "wash-and-wear" and the like. The aminoplast type of reactants or resins, i.e., poly(N-methylol)amides, are well known and widely employed in the preparation of such finishes. These aminoplasts, known for use in achieving such finishes, produce excellent creaseproofing properties but sometimes the finish is not durable to acid washes or the treated fabrics suffer a loss in tensile strength when exposed to chlorine, as from sodium hypochlorite bleaches followed by hot pressing or ironing.

This loss in tensile strength is particularly severe after the fabric has been washed in commercial laundries which employ an acid sour operation. Various materials and processes have been suggested heretofore for diminishing the strength loss due to chlorine retention, but none to date have proved entirely satisfactory.

Accordingly, it is an object of the present invention to provide a novel class of compounds and a process of employing the same on cellulosic textile materials whereby the material so treated is characterized by a high order or wrinkle resistance and wrinkle recovery, which finish is durable to acid washes and which finish results in a material characterized by relatively little loss in tensile strength due to chlorine bleaching when hot pressed or scorched subsequent to chlorine bleaching or subjected to acid sours and similar treatments.

These and other objects and advantages of the present invention will become more apparent from the detailed description thereof set forth hereinbefore.

In accordance with the present invention, a novel class of compounds are provided which may be represented by the formula

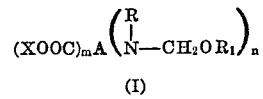

(I)

where A is the residue of a carboxylated organic amide; X is selected from the group consisting of hydrogen, alkyl and a monovalent salt-forming atom or group; R is selected from the group consisting of hydrogen, alkyl or —CH$_2$OR$_1$; R$_1$ is selected from the group consisting of hydrogen and lower alkyl; m is a positive value of about 0.2 and larger, though preferably at least 1; n is normally at least 2 but may be 1 when R is —CH$_2$OR$_1$; N is nitrogen of the amide type; and m+n is equal to the valence of A.

As noted above, m is a positive value of about 0.2 and larger, though preferably a value of at least 1. It will be appreciated that the minimum value for m being about 0.2 and above is an average value, which may be obtained, for example, by mixing a compound where m is 1 with four parts of such a compound where m is zero. Obviously, the value of 0.2 might also refer to the average analytical value for (XOOC) groups for any given production batch of product.

As noted above, the invention further relates to the process of applying compounds of the formula above to cellulosic textile materials and to the textile materials so treated.

With respect to Formula I above, the radical A may be varied widely. Thus, it may be a polycarbonyl radical having as a nucleus a group of atoms, either straight chain or cyclic, either homogeneous or heterogeneous, and either aliphatic or aromatic. Examples of such groups of atoms are the trivalent radicals derived from alkanes, such as ethane, propane, butane and the like; cyclic alkenes such as cyclohexanes; aromatic hydrocarbons, such as benzene, toluene and the like. Secondly, the radical A may be the nucleus of a triazine or pyrimidine.

The nitrogen atoms in the compounds of Formula I are the amide type, i.e., in what will be referred to as type A compounds, they are part of a carboxamide (carbamyol) group. Thus, —CO—N<, or they may be of the kind referred to as type B, where the nitrogen atom is part of groupings such as

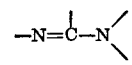

The carboxamide types are amides of carboxylic acids and include not only amides of the acetamide type, but also urea, cyclic ureas, urons, triazones, and the like. The second type, or type B, are represented by aminotriazines and aminopyrimidines.

In general, the compounds of type A discussed hereinabove may be characterized by the formula:

$(HOOC)_m$—D[$(CH_2)_pCONH_2$]$_n$ where p is 0 or a small whole number, providing the radicals within [ ] are attached to different atoms of D when p is 0.

Preferred type A compounds may be represented by the formula

where D, as in the case above, is a nucleus having a valence of at least 3, such as a nitrogen or a short-chain hydrocarbon residue, and $m$ and $n$ are as identified hereinabove.

With respect to type B compounds of the present invention, the preferred compounds may be represented by the formula

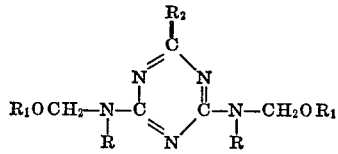

wherein R is selected from the group consisting of hydrogen, alkyl, carboxyalkyl and $-CH_2OR_1$; $R_1$ is selected from the group consisting of hydrogen and alkyl; and $R_2$ is selected from the group consisting of hydrogen, alkyl, carboxyalkyl and

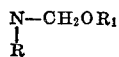

providing the molecule contains at least one carboxy group.

Compounds of the general formula covering both type A and type B compounds of this invention and wherein $R_2$ is hydrogen may be prepared by reacting an amide of the formula

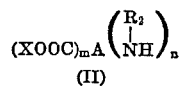

(II)

where $R_2$ is selected from the group consisting of hydrogen and alkyl, with formaldehyde under acid, neutral or alkaline conditions, preferably under alkaline conditions.

The methylol compounds of Formula I or the formaldehyde condensates of the amides set forth in Formula II above may be alkylated by reacting with an alcohol and preferably lower aliphatic alcohols such as methanol, ethanol, propanol, butanol and the like in the presence of an acid. In this manner, compounds of Formula I wherein $R_1$ is alkyl may be prepared.

Compounds of Formula II which will produce products of type A include monocarboxy-dicarboxamides, dicarboxy-dicarboxamides, monocarboxy-tricarboxamides, and the like.

Representative aliphatic, non-cyclic monocarboxy-dicarboxamides include 2,3-dicarbamoylpropionic acid (by carbamoyl is meant $-CO-NH_2$), 2,4-dicarbamoyl-2-methylbutyric acid, 2,3-dicarbamoyl-3-methyl-4-phenylbutyric acid, 4,4-dicarbamoylbutyric acid, 2,4-dicarbamoyl-2-methylvaleric acid, 2,4-dicarbamoyl-2-ethylhexanoic acid, 2,3-dicarbamoyl-3-phenyloctanoic acid, diamide of citric acid, diamide of tricarballylic acid, and the like.

Representative aliphatic, non-cyclic dicarboxy-dicarboxamides include 2,3-dicarbamoylsuccinic acid,
2,3-dicarbamoyl-2-methylsuccinic acid,
2,4-dicarbamoyl-3-methylglutaric acid,
2,3-dicarbamoyl-3,4-dimethylglutaric acid,
2,4-dicarbamoyl-3-pentylglutaric acid,
4,4-dicarbamoylpimelic acid,
2,3-dicarbamoylmaleic acid,
bis(carbamoylmethyl)malonic acid,
bis(2-carbamoylethyl)malonic acid,
bis(4-carbamoylbutyl)malonic acid, and the like.

Representative aliphatic, non-cyclic monocarboxytri-carboxamides include 2,4,4-tricarbamoylbutenoic acid, 2,5,5-tricarbamoyl-2-pentenoic acid, 2,2-bis(2-carbamoylethyl)malonamic acid, and the like.

Representative aliphatic, non-cyclic carboxamides containing nitrogen in the nucleus include N-carbamoylmethyl-N-(2-carbamoylethyl)-3-aminopropionic acid,
3-bis[(2-carbamoylethyl)amino]propionic acid,
2-[bis(2-carbamoylethyl)amino]propionic acid,
2-[bis(2-carbamoylethyl)amino]succinic acid,
2,2-diureidoacetic acid,
2-[bis(2-carbamoylethyl)amino]butyric acid,
2-[bis(2-carbamoylethyl)amino]-3-methylbutyric acid,
N,N-bis(2-carbamoylethyl)fumaramic acid,
N,N-bis(2-carbamoylethyl)glutamic acid,
N,N-bis(carbamoylethyl)glycine,
N,N-bis(carbamoylethyl)glycine,
N-(1,1-dicarbamoylethyl)glycine,
N,N-bis(2-carbamoylethyl)maleamic acid,
N,N-bis(2-carbamoylethyl)succinamic acid,
5-[bis(2-carbamoylethyl)amino]valeric acid, and the like.

Representative aliphatic, cyclic carboxamides include 4-carboxymethyl-5-methyl-2-imidazolidinone,
4-(3-carboxypropyl)-5-methyl-2-imidazolidinone,
4-carboxy-2-imidazolidinone,
4,5-dicarboxy-2-imidazolidinone,
4-(6-carboxyhexyl)-2-imidazolidinone,
4-(17-carboxyheptadecyl)-5-methyl-2-imidazolidinone,
4-carboxytrimethyleneurea,
4,5-dicarboxytrimethyleneurea, and the like.

Representative aromatic carboxamides include 1,2-dicarbamoyl - 4,5 - benzenedicarboxylic acid, tricarbamoylbenzenetricarboxylic acid, 2,5 - dicarbamoylterephthalic acid, and the like.

Compounds of Formula II which give products of type B include triazines and pyrimidines; all of the following compounds of type B, or their esters, are known.

Representative triazines include 2-carboxymethylthio-4,6-diamino-s-triazine,
2-(1-carboxyethylamino)-4,6-diamino-s-triazine,
2-(3-carboxypropylamino)-4,6-diamino-s-triazine,
2-(2-carboxyphenylamino)-4,6-diamino-s-triazine,
2-(2-carboxyphenyl)-4,6-diamino-s-triazine,
2-(1-carboxypropylthio)-4,6-diamino-s-triazine,
2-(1-carboxyethylthio)-4,6-diamino-s-triazino,
2-carboxymethyl-4,6-diamino-s-triazine,
2-carboxymethyl-4,6-diamino-s-triazine,
2-(2-carboxyethyl)-4,6-diamino-s-triazine,
2-(8-carboxyoctyl)-4,6-diamino-s-triazine, and the like.

Representative pyrimidines include 4-(carboxymethylthio)2,6-diaminopyrimidine,
5-(p-carboxyphenyloxy)-2,6-diaminopyrimidine,
4-(2-carboxyethylthio)-2,6-diaminopyrimidine,
5-carboxymethyl-6-methyl-2,4-diaminopyrimidine,
4-carboxy-2,6-diaminopyrimidine, and the like.

Representative pyrimidines include 44-(carboxymethylthio)-2,6-diaminopyrimidine,
5-(p-carboxyphenyloxy)-2,6-diaminopyrimidine,
4-(2-carboxyethylthio)-2,6-diaminopyrimidine,
5-carboxymethyl-6-methyl-2,4-diaminopyrimidine,
4-carboxy-2,6-diaminopyrimidine, and the like.

As noted above, a particularly preferred class of compounds coming within the scope of Formula I are those containing N-methylolated propionamide groups, i.e., $-CH_2-CH_2-CO-NH-CH_2OH$ and, of course, one or more carboxy groups. Typical of such compounds are (1) $HOOC-CH_2-N(CH_2CH_2CONHCH_2OH)_2$
(2) $(alkylOOC)_2C(CH_2CH_2CONHCH_2OH)_2$
(3) $HOOC-CH_2CH_2-O-CH_2-C(CH_2-O-CH_2CH_2CONHCH_2OH)_3$
(4) 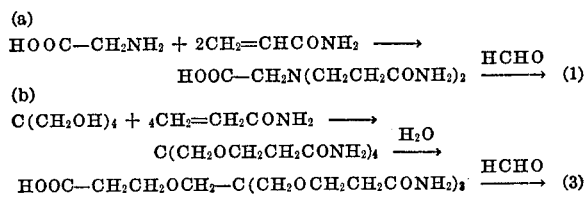

Two general methods are available for making the amides used in the preparation of compounds of (1) and (4). In the first method, suitable compounds containing reactive hydrogens are reacted with acrylamides. If the original compound having the reactive hydrogens doesn't contain a carboxy group, one or more of the carbamoyl groups are then hydrolyzed to a carboxy group. This procedure is shown for compounds of the type represented by (1) and (3) supra.

(a)
$HOOC-CH_2NH_2 + 2CH_2=CHCONH_2 \longrightarrow$
$HOOC-CH_2N(CH_2CH_2CONH_2)_2 \xrightarrow{HCHO}$ (1)

(b)
$C(CH_2OH)_4 + 4CH_2=CH_2CONH_2 \longrightarrow$
$C(CH_2OCH_2CH_2CONH_2)_4 \xrightarrow{H_2O}$
$HOOC-CH_2CH_2OCH_2-C(CH_2OCH_2CH_2CONH_2)_3 \xrightarrow{HCHO}$ (3)

In a second procedure, a suitable compound containing the reactive hydrogens is reacted with acrylonitrile. The nitrile groups are then hydrolyzed to their carbamoyl groups and, if necessary, one or more are further hydrolyzed to the carboxy group. This procedure is shown for compounds of Formula 2 set forth above.

(c)
$(alkylOOC)_2CH_2 + 2CH_2=CH_2CN \longrightarrow$
$(alkylOOC)_2C(CH_2CH_2CN)_2 \xrightarrow{H_2O}$
$(alkylOOC)_2C(CH_2CH_2CONH_2)_2 \xrightarrow{HCHO}$ (2)

The compounds of Formula 4 set forth hereinabove may be prepared in a manner similar to that used for preparing those of 2, the starting material having the general formula

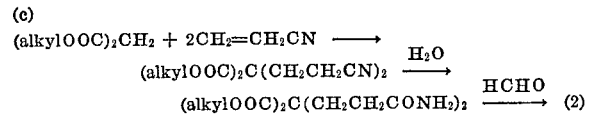

Other carboxy compounds containing propionamide groups are typified by the following formulas:

$HOOC-CH_2CH_2-N(CH_2CH_2CONH_2)_2$ $H_2NCOCH_2CH-N(CH_2CH_2CONH_2)_2$
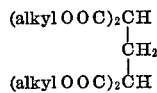

$HOOC-C(CH_2CH_2CONH_2)_2$
   |
   OH $HOOC-CH-O-CH_2CH_2CONH_2$
$HOOC-CH-O-CH_2CH_2CONH_2$

As indicated above, the amides may be methylolated in accordance with standard procedures and in aqueous solutions employing formaldehyde and preferably an alkaline reagent, as for example sodium or potassium hydroxide.

It is not necessary to isolate the products of this invention prior to application to textile materials and they may be applied to such materials from aqueous solutions having a pH of from between 3 and 6 and preferably from between 4 and 4.5 employing standard acid acting curing catalysts at elevated temperatures to fix the finish upon the material.

The compounds of this invention may be applied to cellulosic textile material and, preferably, cotton fabric by any of the well known techniques, as for example spraying, dipping, immersing, padding and the like in such amounts as to apply from between 1 and about 25% and, in some instances, higher amounts of the composition of this invention, based on the dry weight of the fabric. Within certain limits, the amount of reactant applied depends on the particular type of fabric being treated. Thus, in treating fabric consisting of cotton fibers, the concentration of from 1 to about 25% and, preferably, from between 3 and 10% resin solids based on the dry weight of the fabric are utilized.

Normally, the resinous composition is applied with a curing catalyst or accelerator. The catalyst utilized may be free acid, acid salts, alkanolamine salts, metal salts and the like. The concentration of catalyst employed may range from about 0.1 to about 25% or higher, based on the weight of the reactant, depending upon the particular catalyst type employed. Thus, for example, from between about 0.1 and about 10% of a free acid, such as phosphoric, tartaric, oxalic or the like, may be employed, while in the case of ammonium chloride amounts of from between 0.5 and about 10% are used. In the case of amine salts, including alkanolamine salts, such as diethanolamine hydrochloride, from about 1.0 to about 10% are most useful, while with respect to salts such as magnesium chloride, zinc chloride, zinc nitrate, and aluminum chloride, amounts of between about 5 and 25% have been successfully employed. In all instances, the concentration of the catalyst is based on the weight of the resin solids employed.

Following the application of the reactant and curing catalyst to the textile fabric, the material is subject to drying and curing operations to effect the properties of shrinkage control and wrinkle resistance. The drying and curing operation may be carried out in a single step or in separate steps. The temperatures at which the drying and curing operations are effective vary widely and are influenced to some extent by the type of catalyst employed. Normally, the range of temperature extends from about 180° F. to about 450° F. or even higher. Generally speaking, the time of the drying and/or curing operation is inversely proportional to the temperature employed, and of course is influenced by whether or not separate or combined drying and curing steps are employed.

Generally, when drying and curing is carried out in a combined operation, a time of from about 1 minute to about 10 minutes may be employed at temperatures from about 450 to 250° F., respectively. When the fabric has been dried preliminary to curing, curing times of the order of 5 minutes to about ¼ minute at a temperature of from between 250 and 450° F., respectively, have been successfully employed.

In order to illustrate the present invention, the following examples are given primarily by way of illustration. No specific details or enumerations contained therein should be construed as limitations on the present invention except as they appear in the appended claims. All parts and percentages are by weight unless otherwise clearly designated.

EXAMPLE 1

Tetrakis(2-carbamoylethoxymethyl)methane

$C(CH_2OCH_2CH_2CONH_2)_4$ (A) Tetra(2-carbamoylethoxymethyl)methane [U.S. Pat. 2,359,708; hydrolysis of tetrakis(2 - cyanoethoxymethyl)methane] is purified by recrystallization from methanol and then from dimethylformamide to give crystals melting at 158–160° C.

*Analysis.*—Calcd. for $C_{17}H_{32}N_4O_8$ (percent): C, 48.5; H, 7.6; N, 13.3; O, 30.5. Found (percent): C, 47.2; H, 7.7; N, 13.3; O, 31.0.

(B) To a mixture of 800 parts of tertiary butanol, 230 (1.7 moles) of pentaerythritol and 108 parts of 25% aqueous tetraethylammonium hydroxide at 40–45° C., there is added 720 parts (10.1 moles) of acrylamide. After a 2-hour reaction period at 45–50° C., the precipitated product is separated by filtration and washed with acetone.

When recrystallized from dimethylformamide, the tetrakis (2-carbamoylethoxymethyl)methane melts at about 155–158° C.

EXAMPLE 2

Tetrakis[2-(N-methylolcarbamoyl)ethoxymethyl]methane $$C(CH_2OCH_2CH_2CONHCH_2OH)_4$$

The pH of a reaction mixture comprising 119 parts of 44% Formalin (1.74 moles of formaldehyde), 120 parts of water and 150 parts (0.36 mole) of tetrakis(2-carbamoylethoxy)methane [product of Example 1(A)] at 50° C. is adjusted to 10.0 by adding about 4.5 parts of 50% aqueous sodium hydroxide. After 45 minutes, analysis for unreacted formaldehyde indicates that 3.92 moles of formaldehyde per mole of amide have reacted. The pH is then adjusted with nitric acid to about 7.5.

Analysis showed that the final product contained 0.15 mole of —COOH per mole of amide used.

EXAMPLE 3

The product solution of Example 2 is applied to 80 x 80 cotton percale at a 5% solids level (O.W.F.). The application is made by standard padding procedure from an aqueous pad bath of pH 4.0 containing 12% of magnesium chloride based on the resin solids. The treated fabric is dried at 225° F. for 1 minute and then heated at 350° F. for 1.5 minutes. The fabric is then process washed using warm water containing 1% sodium carbonate and 0.5% non-ionic surface active agent (condensation product of nonylphenol and about 9.5 moles of ethylene oxide) and dried at 225° C.

The wrinkle recovery (total warp plus fill) of the treated and untreated fabrics is measured in degrees by Tentative Test Method 66–1959T of the American Association of Textile Chemists and Colorists.

The tensile strength loss due to chlorine retention followed by scorching is measured by Standard Test Method 92–1962 of the American Association of Textile Chemists and Colorists.

The strength loss due to chlorine retention is repeated after the fabrics are subjected to an acid stripping operation to simulate repeated commercial launderings wherein acid sours are employed. In the stripping operation, the fabric is immersed for 20 minutes in water at 120° F. containing 5% of urea and 0.5% of phosphoric acid. The fabrics are then rinsed in water at 80° F., in 0.1% aqueous sodium carbonate at 80° F., in water again and finally press dried.

The results are shown in Table I.

TABLE I

| Fabric: | Wrinkle degree recovery, | Tensile strength—chlorine scorch | | | |
|---|---|---|---|---|---|
| | | Before acid stripping | | After acid stripping | |
| | | Initial, lb. | Scorch, lb. | Initial, lb. | Scorch, lb. |
| Untreated | 189 | 56 | 54 | 57 | 56 |
| Treated | 255 | 33 | 0 | 36 | 0 |

EXAMPLE 4

(2-carboxyethoxymethyl)-tris(2-carbamoylethoxymethyl)methane $$HOOC—CH_2CH_2OCH_2—C(CH_2OCH_2CH_2CONH_2)_3$$

To a warm solution of 210 parts (0.5 mole) of tetrakis (2-carbamoylethoxymethyl)methane [product of Example 1(B)] in 300 parts of water, there is added about 120 parts of 5 N aqueous sodium hydroxide. The reaction mixture is then distilled in vacuo while collecting the distillate. Additional water is added to the reaction mixture as required. The distillation is continued until analysis of the reaction mixture indicates the presence of the theoretical amount (0.5 mole) of carboxy compound. Titration of the distillate shows the presence of 0.5 mole of ammonia. The reaction mixture is used in Example 5.

EXAMPLE 5

(2-carboxyethoxymethyl)-tris[2-(N-methylolcarbamoyl)-ethoxymethyl]methane $$HOOC—CH_2CH_2OCH_2—C(CH_2OCH_2CH_2CONHCH_2OH)_3$$

The product solution from Example 4, containing 0.5 mole of (2 - carboxyethoxymethyl) - tris(2 - carbamoylethyl)methane, and 136 parts of 44% Formalin (2.0 moles of formaldehyde) are reacted at 25–35° C. for 3 hours. The pH is then adjusted to about 3.0 with hydrochloric acid.

EXAMPLE 6

The product solution of Example 5 is applied to 80 x 80 cotton percale at a 5% solids level (O.W.F.) by the procedure of Example 3, except for the curing of the finish which in this example is done at 350° F. for 1 minute. The treated fabric is tested by the procedures of Example 3. The results are shown in Table II.

TABLE I

| Fabric: | Wrinkle recovery, degree | Tensile strength—chlorine scorch | | | |
|---|---|---|---|---|---|
| | | Before acid stripping | | After acid stripping | |
| | | Initial, lb. | Scorch, lb. | Initial, lb. | Scorch, lb. |
| Untreated | 196 | 55 | 53 | 58 | 56 |
| Treated | 260 | 24 | 29 | 30 | 28 |

These results should be compared with those obtained in Example 3 to show the beneficial effect of having a carboxy group present.

EXAMPLE 7

Methylolation of crude tetrakis(2-carbamoylethoxymethyl)methane

A mixture comprising 100 parts of crude tetrakis(2-carbamoylethoxymethyl)methane (obtained by the procedure of U.S. Pat. 2,359,708, i.e., the recrystallization step of Example 1 (A) is omitted), 79 parts of 44% Formalin and 80 parts of water is adjusted to 48–50° C. and a pH of 10 by adding 3.8 parts of 50% aqueous sodium hydroxide. After about 1.5 hours, analysis for unreacted formaldehyde indicates that 3.7 moles of formaldehyde per mole of amide have reacted. The pH is then adjusted to 7.0 with nitric acid. Analysis indicates the presence of carboxy groups equivalent to 0.27 mole of (2-carboxyethoxymethyl) - tris[2 - (N-methylolcarbamoyl)-ethoxymethyl]methane per mole of amide. (In other words, 27% of the original tetramido compound has been converted to the mono-carboxymethylolated triamide of Example 5.)

EXAMPLE 8

The product solution of Example 7 is applied to 80 x 80 cotton percale at a 5% (O.W.F.) by the procedure of Example 6. The treated fabric is tested by the procedure of Example 3. The results are shown in Table III.

TABLE I

| Fabric: | Wrinkle recovery, degree | Tensile strength—chlorine scorch | | | |
|---|---|---|---|---|---|
| | | Before acid stripping | | After acid stripping | |
| | | Initial, lb. | Scorch, lb. | Initial, lb. | Scorch, lb. |
| Untreated | 196 | 55 | 53 | 58 | 56 |
| Treated | 236 | 32 | 26 | 32 | 31 |

These results should be compared with those of Examples 3 and 6. It is demonstrated that it is not necessary to have one mole-equivalent of carboxy group per mole of cross-linking agent in order to obtain the effect of the carboxy group. In other words, a cross-linking agent without a carboxy group can be blended with a similar cross-linking agent containing a carboxy group.

EXAMPLE 9

Diethyl bis(2-methylolcarbamoylethyl)malonate

To a reaction mixture containing 272 parts (0.9 mole) of diethyl bis(2-carbamoylethyl)malonate [J. Org. Chem. 20, 1702 (1955)], 150 parts of water and 200 parts of 44% Formalin (2.94 moles of formaldehyde) at a temperature of 40–45° C., there is added 38 parts of 50% aqueous sodium hydroxide over a period of about one hour. Analysis for unreacted formaldehyde indicates that about 1.8 moles of formaldehyde has reacted with the amide. The pH of the resulting solution is adjusted to 4.0 with hydrochloric acid. The solids content is about 50%.

EXAMPLE 10

The product solution of Example 9 is applied to white cotton broadcloth at two levels of application. A commercial melamine - formaldehyde - ethyleneurea - formaldehyde aminoplast textile finish is also applied for comparison.

(A) 5% solids (O.W.F.) product of Example 9.
(B) 2.5% solids (O.W.F.) product of Example 9.
(C) 5.0% solids (O.W.F.) commercial aminoplast.

The finishes are applied from aqueous baths of pH 4 containing 12% magnesium chloride, based on the resin solids, by standard padding procedures. The treated fabrics are dried at 225° F. for 1.5 minutes and then heated at 350° F. for 1.5 minutes.

The wrinkle recovery (total warp plus fill) and tensile strength loss of the fabric due to chlorine retention after acid stripping are measured as described in Example 3. The results are shown in Table IV.

TABLE IV

| | Wrinkle recovery degrees | | Tensile strength— Chlorine scorch | | |
|---|---|---|---|---|---|
| | Initial | Acid stripped | Initial, lb. | Scorch, lb. | Percent loss |
| Fabric treatment: | | | | | |
| A | 243 | 242 | 51 | 49 | 2 |
| B | 220 | 218 | 53 | 53 | 0 |
| C | 264 | 223 | 53 | 18 | 67 |

EXAMPLE 11

Tetraethyl 1,7-dicyano-3,3,5,5-heptanetetracarboxylate

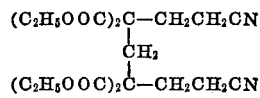

To a mixture comprising 332 parts (1.0 mole) of tetraethyl 1,1,3,3-propanetetracarboxylate (reference: J. Chem. Soc., 1931, p. 673), 300 parts of dioxane and about 20 parts of 35% methanolic solution of tetramethylammonium hydroxide, there is added at 18–30° C., 135 parts of acrylonitrile over about 45 minutes. Additional amounts of the solution of tetramethylammonium hydroxide are added, 10 parts after 15 minutes and 5 parts after 40 minutes from the start of the acrylonitrile addition. After standing for several hours, the upper (organic) layer is separated, treated with about 1.2 parts of concentrated hydrochloric acid and poured into a mixture of ice and water. The mixture is then extracted with chloroform, and the chloroform extract is removed by distillation in vacuo to a final temperature of about 90° C. at a pressure equivalent to 2 millimeters of mercury. The residue solidifies when cooled and allowed to stand. The product, separated by filtration and washed with methanol, melts at 66.2–66.7° C.

Analysis.—Calcd. for $C_{21}H_{30}N_2O_8$ (percent): C, 57.5; H, 6.85; N, 6.40; O, 29.2. Found (percent): C, 57.5; H, 6.90; N, 6.47; O, 29.0.

EXAMPLE 12

Tetraethyl 1,7-dicarbamoyl-3,3,5,5-heptanetetracarboxylate

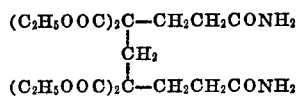

To 300 parts of 85% sulfuric acid, there is added 200 parts of tetraethyl 1,7-dicyano-3,3,5,5-heptanetetracarboxylate (product of Example 11) over 23 minutes at a temperature of 30°–50° C. After 3 hours at 50° C., the reaction mixture is poured into a mixture of ice and water, and about 380 parts of 50% aqueous sodium hydroxide is added to neutralize the acid. The product is separated by extracting with a mixture of acetone and chloroform, evaporating the resulting solution until crystals form, and filtering off the crystals. The product, after recrystallization from methanol, melts at 129–130° C.

Calcd. for $C_{21}H_{34}N_2O_{10}$ (percent): C, 53.0; H, 7.2; N, 5.90. Found (percent): C, 52.9; H, 7.2; N, 5.93.

EXAMPLE 13 tetraethyl 1,7-(N-methylolcarbamoyl)-3,3,5,5-heptanetetracarboxylate

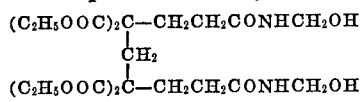

To a mixture of 120 parts of water, 142 parts (0.3 mole) of tetraethyl 1,7-dicarbamoyl-3,3,5,51heptanedicarboxylate (product of Example 12) and 61.5 parts of 44% Formalin (0.9 mole of formaldehyde) there is added 9 parts of 50% aqueous sodium hydroxide over 1.5 hours while maintaining a temperature of 45–50° C. Analysis for reacted formaldehyde indicates that 2 moles of formaldehyde per mole of amide have reacted.

EXAMPLE 14

The product solution from Example 13 is applied to 80 x 80 cotton percale at a 7.4% solids (O.W.F.) level. The application is made by normal padding procedures from an aqueous pad bath containing 12% magnesium chloride based on the amount of resin, and having a pH of 4.0. The fabric is dried and heated at 350° F. for 1.5 minutes.

The wrinkle recovery (total warp plus fill) and tensile strength loss due to chlorine retention after acid stripping of the treated and untreated fabrics are measured as described in Example 3. The results are shown below in Table V.

TABLE V

| | Wrinkle recovery, degrees | Tensile strength— Chlorine scorch | |
|---|---|---|---|
| | | Initial, lb. | Scorch, lb. |
| Fabric: | | | |
| Treated | 261 | 29 | 29 |
| Untreated | 184 | 58 | 47 |

EXAMPLE 15

N,N-bis(carbamoylethyl)glycine

To a solution of 107 parts (1.43 moles) of glycine and about 56 parts (1.4 moles) of sodium hydroxide in 450 parts of water, there is added 213 parts (3.0 moles) of acrylamide over about 15 minutes at a temperature of 35–40° C. After the reaction mixture is heated at 40° C. for about 3 hours and cooled to 20° C., 23 parts of hydrochloric acid (1.4 moles real acid) are added to give a pH of between 3.0 and 3.5. A crystalline product, separated by filtration and washed with methanol-water, amounts to about 216 parts (69% yield).

EXAMPLE 16

N,N-bis[(N'-methylolcarbamoyl)ethyl]glycine

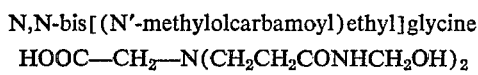

To a solution of 174 parts (0.8 mole) of N,N-bis(carbamoylethyl)glycine (product of Example 15) in 120 parts of water and 120 parts of 44% Formalin (1.76 moles formaldehyde), there is added about 68 parts of 50% aqueous sodium hydroxide over about 1 hour at a temperature of 30–40° C. to obtain a pH of about 10.9. After 2 hours at 40° C., analysis for unreacted formaldehyde indicates that about 1.6 moles of formaldehyde have reacted with the amide. After cooling, the pH of the reaction mixture is adjusted to 5.0 with hydrochloric acid.

EXAMPLE 17

(A) The product solution of Example 16 is applied to 80 x 80 cotton percale at a 5.0% solids (O.W.F.) level. The application is made by normal padding procedures from an aqueous pad bath containing 12% magnesium chloride, based on the weight of the resin, and having a pH of 4. The fabric is dried and then cured at 350° F. for 1.5 minutes.

For comparison, the following finishes are also applied to the same fabric at a 5% level using the same procedure.

(B) Nitrilotris(N-methylolpropionamide) of the formula

The pad bath contained 12% magnesium chloride based on the amount of resin used and had a pH of 4.0.

(C) A commercial melamine - formaldehyde—uron resin aminoplast finish—12% magnesium chloride based on the weight of the resin.

The wrinkle recovery (total warp plus fill) and tensile strength loss due to chlorine retention of the treated fabrics are measured as described in Example 3.

Before determining the strength loss due to chlorine retention, the fabrics are subjected to five washes of 5 minutes duration in 0.05% aqueous solutions of zinc silicofluoride with hot pressing of the fabric for 30 seconds after each wash, except the final wash, which is followed by a water rinse at 72° F. and a hot pressing.

The results are shown in Table VI.

TABLE VI

| Fabric treatment: | Wrinkle recovery (percent) | Tensile strength—Chlorine scorch | |
|---|---|---|---|
| | | Initial, lb. | Scorch, lb. |
| A | 241 | 35 | 23 |
| B | 267 | 30 | 17 |
| C | 262 | 41 | 19 |

EXAMPLE 18

N-(2-dicarbethoxyethyl)-N,N',N'',N''',N'''-pentakis(methoxymethyl)-2,4,6-triamino-s-triazine

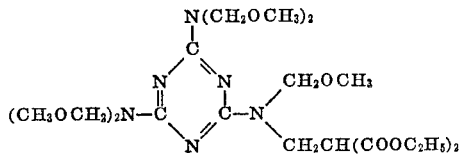

Ao a solution of 25 parts (0.156 mole) of diethylmalonate in 90 parts of tetrahydrofuran there is added 3.56 parts (0.155 mole) of sodium. When the sodium has completely reacted, a solution of 44 parts (0.116 mole) of N-chloromethyl - N,N',N'',N''' - pentakis(methoxymethyl)-2,4,6-triamino-s-triazine in 100 parts of chloroform is added. The alkaline reaction mixture is neutralized with carbon dioxide. The solvents are evaporated and the residue is dissolved in ether. The ether solution is washed with water, dried and evaporated to dryness. A vacuum equivalent to about 0.1 mm. of mercury is applied to the residue to remove any volatile materials. The product amounts to 52 parts (86% of theory).

Calcd. for $C_{21}H_{38}N_6O_9$ (percent): C, 48.5; H, 7.33; N, 16.2. Found (percent): C, 48.3; H, 7.12; N, 16.4.

EXAMPLE 19

(A) The product of Example 18 is applied to 80 x 80 cotton percale at a 5% solids (O.W.F.) level. The application is made by normal padding procedures from an approximately 30/70 isopropanol/water pad bath containing 12% magnesium chloride based on the resin solids.

(A) A similar application is made with N,N,N',N',N'',N''-hexakis(methoxymethyl)-2,4,6-triamino - s - triazine for comparison.

The fabrics are dried at 225° F. for 2 minutes and then heated at 350° F. for 1.5 minutes.

The wrinkle recovery (total warp plus fill) and tensile strength loss due to chlorine retention of the fabrics are measured as described in Example 3.

Before determining the strength loss due to chlorine retention, the fabrics are subjected to five washes as described in Example 17.

The results are shown in Table VII.

TABLE VII

| Fabric treatment: | Wrinkle recovery, degrees | Tensile strength—chlorine scorch | |
|---|---|---|---|
| | | Initial, lb. | Scorch, lb. |
| A | 244 | 26 | 21 |
| B | 257 | 36 | 11 |
| Untreated | 171 | 53 | 56 |

EXAMPLE 20

Citramic acid

To a solution of 114 parts (0.6 mole) of citramide in 400 parts of water is added a solution of 4.8 parts of NaOH in 24 parts of water. The resulting mixture is distilled under vacuum for 50 minutes at a temperature of 57° C. To the residue from this distillation (315 parts) is added 108 parts of 37% formaldehyde. The resulting solution is heated at 38°–48° C. for 100 minutes, during which time the pH is maintained at 7.8–9.1 by the incremental addition of a total of 6.7 parts of 50% NaOH. 37 parts of a 37% formaldehyde solution are then added and the mixture held at 40–42° C. for 135 minutes while the pH is maintained at 8.5 through addition of 3 parts of 50% NaOH. The pH of the mixture is then reduced to 4 through addition of 11 parts of 37% HCl.

An analysis of the final mixture shows that 2.6 moles of formaldehyde have reacted per mole of starting citramide and that 0.475 mole of —COOH groups are present per mole of starting citramide.

EXAMPLE 21

The product solution from Example 20 is applied to 80 x 80 cotton percale at a 5.0% solids (O.W.F.) level. The application is made by normal padding procedures from an aqueous pad bath containing 12% magnesium chloride on the amount of resin, and having a pH of 3.8. The padded fabric is dried for one minute at 225° F. and cured at 350° F. for one minute. The fabric is then process washed to remove soluble salts and dried.

The wrinkle recovery (total warp plus fill) and tensile strength loss due to chlorine retention for the before and after acid stripping of the treated fabric is compared with that of untreated fabric and with fabric treated with a typical commercial triazone finish. The tests are carried out in the manner described in Example 3.

The results are shown in Table VIII.

It should be noted that the acid stripping operation causes no loss in wrinkle recovery of the fabric treated with the product of this example in contrast to the high loss suffered by the triazone finished fabric. Furthermore, the loss in strength due to bleaching and scorching is much greater for the triazone finish than for the methylolated citramic acid finish.

TABLE VIII

| Fabric: | Wrinkle recovery | | Tensile strength of chlorinated fabric | | | |
|---|---|---|---|---|---|---|
| | Before acid stripping | After acid stripping | Before acid stripping | | After acid stripping | |
| | | | Not scorched | Scorched | Not scorched | Scorched |
| Treated | 242 | 250 | 32 | 32 | 35 | 32 |
| Untreated | 179 | 170 | 53 | 45 | 49 | 48 |
| Triazone treated | 245 | 217 | 35 | 34 | 37 | 27 |

What is claimed is:

1. A process for imparting crease resistance to cellulosic textile materials which comprises applying thereto an aqueous solution of a compound of the formula

HOOC—CH$_2$CH$_2$—O—CH$_2$—C(CH$_2$—O—CH$_2$CH$_2$CONHCH$_2$OH)$_3$ and thereafter drying said materials and curing said compound thereon in the presence of a catalyst and by the application of heat.

2. A process for imparting crease resistance to cellulosic textile materials which comprises applying thereto an aqueous solution of a compound of the formula (HOOC)$_2$C(CH$_2$CH$_2$CONHCH$_2$OH)$_2$ and thereafter drying said materials and curing said compound thereon in the presence of a catalyst and by the application of heat.

3. A process for applying crease resistance to cellulosic textile materials which comprises applying thereto an aqueous solution of a compound of the formula

HOOC—CH$_2$—N(CH$_2$CH$_2$CONHCH$_2$OH)$_2$ and thereafter drying said materials and curing said compound thereon in the presence of a catalyst and by the application of heat.

4. A process for imparting crease resistance to cellulosic textile materials which comprises applying thereto an aqueous solution of a compound of the formula (HOOC)$_2$—C—CH$_2$CH$_2$CONHCH$_2$OH
         |
         CH$_2$
         |
(HOOC)$_2$—C—CH$_2$CH$_2$CONHCH$_2$OH and thereafter drying said materials and curing said compound thereon in the presence of a catalyst and by the application of heat.

References Cited

UNITED STATES PATENTS

| 2,955,057 | 10/1960 | Gagliardi et al. | 117—139.4 |
| 2,118,685 | 5/1938 | Stadler | 117—139.4 |
| 3,041,199 | 6/1962 | Miller et al. | 117—139.4 X |
| 3,168,415 | 2/1965 | Goldstein et al. | 117—139.4 |

WILLIAM D. MARTIN, Primary Examiner

T. G. DAVIS, Assistant Examiner

U.S. Cl. X.R.

8—116.2; 117—143 A, 161 LN

UNITED STATES PATENT OFFICE
CERTIFICATE OF CORRECTION

Patent No. 3,705,822       Dated December 12, 1972

Inventor(s) JOHN PETER DUNDON

It is certified that error appears in the above-identified patent and that said Letters Patent are hereby corrected as shown below:

Column 3, line 31 delete "$R_2$" and replace with -- $R_1$ --

Column 4, Delete lines 64 through 71.

Column 8, line 25 delete "TABLE I" and replace with --TABLE II--

Column 8, line 65 delete "TABLE I" and replace with --TABLE III--

Column 11 line 67 delete "Ao" and replace with -- To --

Signed and sealed this 17th day of April 1973.

(SEAL)
Attest:

EDWARD M. FLETCHER, JR.
Attesting Officer

ROBERT GOTTSCHALK
Commissioner of Patents